UNITED STATES PATENT OFFICE.

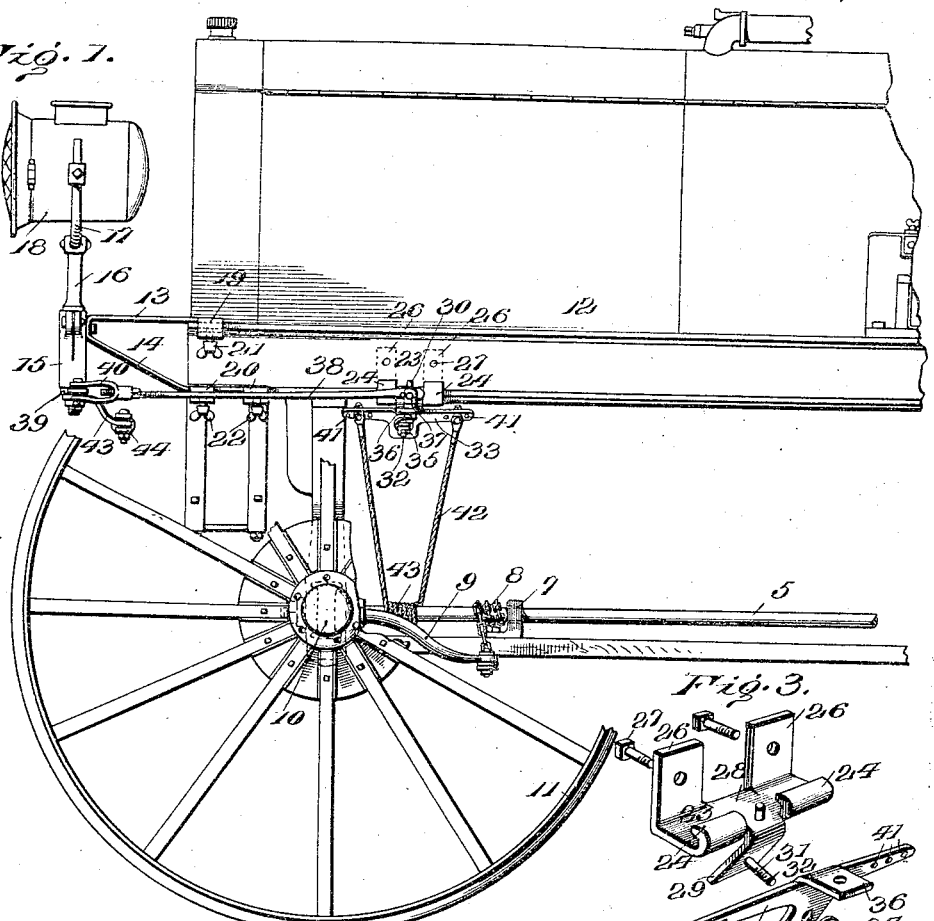

ARTHUR E. DOBBS, OF WINONA, MINNESOTA.

LAMP-SUPPORT FOR VEHICLES.

1,064,454.  Specification of Letters Patent.  Patented June 10, 1913.

Application filed July 31, 1912. Serial No. 712,607.

*To all whom it may concern:*

Be it known that I, ARTHUR E. DOBBS, a citizen of the United States, residing at Winona, in the county of Winona and State of Minnesota, have invented certain new and useful Improvements in Lamp-Supports for Vehicles, of which the following is a specification.

My invention is particularly designed for use upon automobiles or traction engines of the type in which the steering is effected through a horizontal steering shaft connected to the front steering wheels of the automobile or traction engine by suitable connections, to cause the wheels to turn in the desired direction, such for instance as a chain winding around the shaft and connecting to arms secured to the stub axles.

The object of my invention is to provide a means for connecting the headlights of the automobile or traction engine to the horizontal steering shaft in such a way that the headlights will turn in relation to the frame of the vehicle in accordance with the movements of the steering wheels of the vehicle, whereby the headlights will be caused to throw their rays in the path which the vehicle is about to traverse.

A further object of my invention is to provide a construction of this character which may be readily attached to and detached from a vehicle of the class indicated easily and expeditiously, and without the necessity of drilling holes in the frame of the machine.

With these and other objects in view my invention consists in certain constructions, combinations and arrangements of parts the preferred form of which will be first described in connection with the accompanying drawings, and then the invention particularly pointed out in the appended claim.

Referring to the drawings wherein the same part is designated by the same reference numeral wherever it occurs, Figure 1 is a side elevation of the front portion of a traction engine equipped with my invention, the parts being shown in dotted lines to more clearly illustrate the construction. Fig. 2 is a perspective view of the front of Fig. 1, and Fig. 3 is a detail perspective view of the clamp and rock arm in separated relation.

5 designates the horizontal steering shaft of a traction engine or automobile mounted in bearings 7 and connected by a chain 8 to the arm 9 of the stub shaft 10 carrying the steering wheels 11, as is common in this type of automobile or traction engine. It is apparent that the stub shaft 10 carrying the wheels 11 will be turned in accordance with the direction and amount of rotation of the steering shaft 5. In the ordinary form of traction engine, such as indicated, the side bars of the chassis are formed of U-shaped beams, as indicated at 12. To the front end of these side bars 12 I clamp the arms 13 and 14, which at their forward end support the vertical bearings 15. Through the bearing 15 extends the supporting shaft 16 for the harp 17 on which is mounted the headlight 18. Preferably, and as shown, the arms 13 and 14 are secured to the parallel sides of the U beam 12 by means of the clamps 19 and 20, extending around the arms 13 and 14 respectively and the sides of the beam, and held in position by a set screw 21, 22. It is to be understood of course that where a pair of headlights are used each light is preferably mounted by the means just described.

23, 23 designate a pair of hooks having the hook portion 24 adapted to extend over the edge of the lower side of the U beam, the body portion 25 adapted to extend beneath the lower side of the U beam and the back portion 26 carrying a set screw 27 adapted to extend up behind the U beam, whereby the hooks may be placed upon the beam, and by means of the set screw 27 secured in place. Extending between the body portion 25 of the hooks is a bracket 28 having a downwardly extending portion 29 adapted to extend when the hooks are in position below the U beam 12, said bracket being preferably provided with a pin 30 adapted, when in position, to bear against the outer edge of the U beam. The downwardly extending portion 29 of the bracket is provided with an outwardly extending pivot 31, preferably threaded on its end as indicated at 32, on which is pivoted the rock arm 33, 33. Preferably I provide a washer 34 and a nut 35 to secure the rock arm on the pivot 31. The rock arm 33 is provided at its middle portion with the outwardly extending part 36, in which is mounted a fork 37, to which is connected one end of a rod 38, the other end of the rod being connected to an arm 39 secured to the lower end of the shaft 16 of one of the head lights by means of the fork 40, pivotally connected to the end of the arm 39.

The ends of the rock arm 32 are preferably provided with a plurality of openings 41 to which are secured the opposite ends of a cord or wire cable 42, the middle portion of the cord being wrapped around the horizontal steering shaft 5, as indicated at 43, so that as the shaft 5 is rotated the rock arm 33 will, through the cord or cable, be oscillated, which will, through the bar 38 and the arm 39, turn the headlight so that the rays of the lamp will be thrown into the path the vehicle is about to traverse. By providing a plurality of holes 41 the amount of movement given a lamp in proportion to the turning movement of the steering shaft 5 can be adjusted so that the movement of the lamp will be in accordance with the turning of the vehicle. When a pair of lamps are used, as shown in the drawings, these lamps are connected together by providing each of the shafts 16 with an arm 43 connecting said arms together by means of a rod 44.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

The combination with a motor driven vehicle having a horizontally extending steering shaft, of a lamp support rotatably mounted upon the vehicle, a pair of hooks, a bracket carried by the hooks, means for securing the hooks to the frame of the vehicle, a rock arm pivotally mounted on the bracket, a cord connecting the ends of the rock arm and wound around the horizontal steering shaft, and means connecting the central portion of the rock arm to the lamp support.

In testimony whereof I affix my signature in presence of two witnesses.

ARTHUR E. DOBBS.

Witnesses:
D. E. TAWNEY,
MAUDE R. WHITE.